(12) United States Patent
Ishizaki

(10) Patent No.: US 7,689,352 B2
(45) Date of Patent: Mar. 30, 2010

(54) NAVIGATION SYSTEM

(75) Inventor: Mitsuru Ishizaki, Obu (JP)

(73) Assignee: DENSO CORPORATION, Kariya (JP)

( * ) Notice: Subject to any disclaimer, the term of this patent is extended or adjusted under 35 U.S.C. 154(b) by 808 days.

(21) Appl. No.: 11/524,465

(22) Filed: Sep. 21, 2006

(65) Prior Publication Data

US 2007/0106469 A1    May 10, 2007

(30) Foreign Application Priority Data

Nov. 9, 2005    (JP) .............................. 2005-324609

(51) Int. Cl.
*G01C 21/30* (2006.01)
*G01C 21/32* (2006.01)

(52) U.S. Cl. ................... 701/211; 701/200; 701/209; 701/210; 340/988; 340/995.19; 342/357.08

(58) Field of Classification Search ................ 701/209, 701/201, 211; 340/995, 988, 995.19; 342/357.08
See application file for complete search history.

(56) References Cited

U.S. PATENT DOCUMENTS

| 4,758,959 | A | * | 7/1988 | Thoone et al. | .............. | 701/221 |
| 5,359,529 | A | * | 10/1994 | Snider | .................... | 701/210 |
| 5,508,931 | A | * | 4/1996 | Snider | .................... | 701/207 |
| 5,541,845 | A | * | 7/1996 | Klein | ....................... | 701/207 |
| 5,675,492 | A | * | 10/1997 | Tsuyuki | ................... | 701/210 |
| 5,689,423 | A | * | 11/1997 | Sawada | ................... | 701/202 |
| 5,793,631 | A | | 8/1998 | Ito et al. | | |
| 5,845,228 | A | * | 12/1998 | Uekawa et al. | .............. | 701/209 |
| 5,931,888 | A | * | 8/1999 | Hiyokawa | .................. | 701/208 |
| 6,138,073 | A | * | 10/2000 | Uchigaki | .................... | 701/208 |
| 6,144,318 | A | | 11/2000 | Hayashi et al. | | |
| 6,807,480 | B1 | * | 10/2004 | Iwasaki et al. | ............. | 701/209 |
| 6,807,482 | B2 | * | 10/2004 | Utsumi | ..................... | 701/209 |
| 6,810,326 | B1 | * | 10/2004 | Kawasaki | .................... | 701/209 |
| 6,810,329 | B2 | * | 10/2004 | Koga | .......................... | 701/211 |
| 6,820,003 | B2 | * | 11/2004 | Ueno | ......................... | 701/209 |
| 6,826,475 | B2 | | 11/2004 | Sugiura et al. | | |
| 6,836,724 | B2 | * | 12/2004 | Becker et al. | ............... | 701/200 |
| 6,847,889 | B2 | * | 1/2005 | Park et al. | ................... | 701/209 |
| 6,847,890 | B1 | * | 1/2005 | Childs et al. | ................ | 701/211 |
| 6,850,844 | B1 | * | 2/2005 | Walters et al. | .............. | 701/216 |
| 6,853,915 | B2 | * | 2/2005 | Hubschneider et al. | ..... | 701/209 |
| 6,859,724 | B2 | * | 2/2005 | Komatsu | .................... | 701/202 |
| 6,862,524 | B1 | * | 3/2005 | Nagda et al. | ................ | 701/209 |

(Continued)

FOREIGN PATENT DOCUMENTS

JP    A-9-325041    12/1997

(Continued)

*Primary Examiner*—Khoi Tran
*Assistant Examiner*—Jaime Figueroa
(74) *Attorney, Agent, or Firm*—Posz Law Group, PLC

(57) ABSTRACT

When a user turns on an ignition switch at a parking lot so as to restart travel to a destination, a navigation system computes a distance from the parking lot to an intermediate position included in a guide route currently designated. When the computed distance is within a predetermined distance, whether the user has visited the intermediate position or not is inquired of the user. When the user inputs that the intermediate position has been visited, the navigation system re-designates a new guide route to the destination without need to pass by the intermediate position.

5 Claims, 4 Drawing Sheets

U.S. PATENT DOCUMENTS

| | | | |
|---|---|---|---|
| 6,879,911 B1 * | 4/2005 | Utsumi et al. | 701/209 |
| 6,895,328 B2 * | 5/2005 | Manabe et al. | 701/208 |
| 6,898,518 B2 * | 5/2005 | Padmanabhan | 701/207 |
| 2002/0059190 A1 * | 5/2002 | Ishizaki | 707/2 |
| 2004/0044464 A1 * | 3/2004 | Sugiura et al. | 701/200 |

FOREIGN PATENT DOCUMENTS

| | | |
|---|---|---|
| JP | A-10-332405 | 12/1998 |
| JP | A-2000-193478 | 7/2000 |
| JP | A-2002-318123 | 10/2002 |

* cited by examiner

NAVIGATION SYSTEM

CROSS REFERENCE TO RELATED APPLICATION

This application is based on and incorporates herein by reference Japanese Patent Application No. 2005-324609 filed on Nov. 9, 2005.

FIELD OF THE INVENTION

The present invention relates to a navigation system that designates a guide route via an intermediate position to a destination and navigates a subject vehicle based on the guide route.

BACKGROUND OF THE INVENTION

A navigation system has a function to detect a current position and a function to retrieve a guide route from the current position to an inputted destination. While the vehicle is traveling, the navigation system displays the guide route and current position on a map in a display screen to navigate the vehicle to the destination. When the vehicle departs from the guide route during the route guidance, the navigation system re-retrieves a route from the current position to the destination using a re-routing function. The vehicle is then navigated based on the re-retrieved route.

In general, when a destination is inputted in the navigation system, an intermediate location can be also inputted. A guide route is retrieved to go though the inputted intermediate position to the destination. Accordingly, a user can designate a route to visit or pass by an intended place (e.g., a scenic location) on the way to a destination by inputting the intended position as an intermediate position.

A conventional navigation system determines that a subject vehicle has passed by an intermediate position only when the subject vehicle has actually passed by a position inputted as the intermediate position. The vehicle may mistake a heading direction to depart from the guide route. In this case, if there is a certain intermediate position which is not determined to be passed by, the re-routing function designates a new guide route to go via the certain intermediate position to the destination.

However, for instance, in the case of mistaking the heading direction, the user may abandon visiting the certain intermediate position and heads for a next intermediate position or destination even though the certain intermediate position was initially intended to visit. Considering the above situation, a navigation system in Patent Document 1 designates a new guide route as follows. When a subject vehicle starts traveling a route different from the guide route to get away from an intermediate position which is not determined to be passed by, the navigation system assumes that the subject vehicle has passed by the intermediate position and designates a new guide route.

Patent Document 1: JP-2000-193478 A

The above conventional navigation system in Patent Document 1 has another unsolved problem. For instance, assume that a guided route is designated by inputting a store as an intermediate position a user wants to visit on the way to a destination. Since the store has a parking lot a little away from the store, the user drives to the parking lot and walks to the store. After finishing errands at the store, the user backs to the vehicle at the parking lot and starts to drive the vehicle.

In this case, since the store is not arrived at by the vehicle, the navigation system determines that the store as an intermediate position is not passed by or arrived at. The user is therefore guided in a route, which is newly designated to include the store as an intermediate position. The user thinks that he/she has visited the store; the user drives to follow the new guided route without noticing that the vehicle is guided to the store. As the vehicle approaches the store, the user feels strange and then notices that the vehicle is guided to the store, which the user has visited.

Similarly to the case of using the parking lot near the intermediate position, this problem may also arise in the case that a user parks a subject vehicle at a parking lot near a destination and walks to the destination. In this case, when the user re-starts driving the vehicle, the navigation system does not recognize the arrival to the destination and continues guiding the vehicle to the destination, causing the problem.

SUMMARY OF THE INVENTION

It is an object of the present invention to provide a navigation system capable of inquiring of a user whether parking a vehicle near a target position such as intermediate position or destination is regarded as an arrival to the target position.

According to an aspect of the present invention, a navigation system in a vehicle is provided with the following. A guide route is designated to travel from a start position via an intermediate position to a destination. A route guidance is performed based on the guide route. Map data obtaining means is for obtaining map data. Position obtaining means is for obtaining a current position of the vehicle. Distance measuring means is for measuring using the map data a distance to the intermediate position included in the guide route from a current position where the vehicle starts. Selecting means is for selecting the intermediate position as a passed-by intermediate position candidate, which is a candidate of an intermediate position that has been passed by, when the measured distance is within a predetermined distance. Notifying means is for notifying a user of the passed-by intermediate position candidate.

According to another aspect of the present invention, a navigation system in a vehicle is provided with the following. A guide route is designated to travel from a start position to a destination. A route guidance is performed based on the guide route. Map data obtaining means is for obtaining map data. Position obtaining means is for obtaining a current position of the vehicle. Distance measuring means is for measuring using the map data a distance to the destination included in the guide route from a current position where the vehicle starts. Qualifying means is for qualifying the current position, where the vehicle starts, as the destination when the measured distance is within a predetermined distance. Notifying means is for notifying the user that the current position, where the vehicle starts, is qualified as the destination.

According to yet another aspect of the present invention, a navigation system in a vehicle is provided with the following. A map data obtaining unit is for obtaining map data. A position detector is for detecting a current position of the vehicle. A route designating unit is for designating a route from a start position to a target position as a guide route. A route re-designating unit is for re-designating a route from the current position to the target position, when the vehicle departs from the guide route before arriving at the target position, so as to update the guide route. A guiding unit is for guiding the vehicle based on the guide route. A distance measuring unit is for measuring using the map data a distance to the target position, which is included in the guide route and has not been arrived at, from a parked position, where the vehicle is parked and re-starts. An inquiring unit is for inquiring of a user whether the user accepts an assumption that the vehicle has arrived at the target position, when the measured distance is within a predetermined distance.

BRIEF DESCRIPTION OF THE DRAWINGS

The above and other objects, features, and advantages of the present invention will become more apparent from the following detailed description made with reference to the accompanying drawings. In the drawings:

FIG. 6 illustrates an example of a screen window inquiring whether an intermediate position is passed by.

DETAILED DESCRIPTION OF THE PREFERRED EMBODIMENTS

Figure 1:
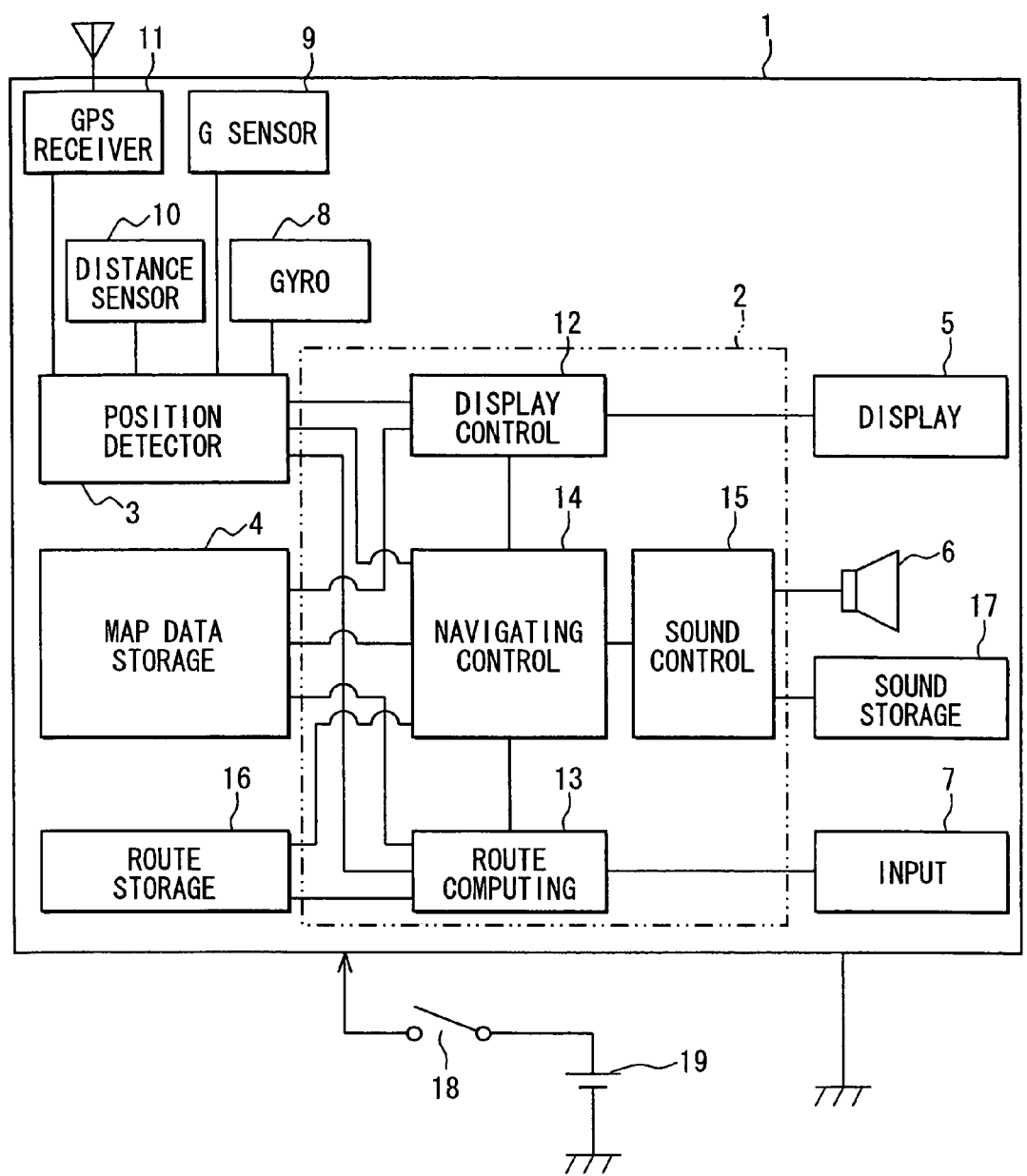
FIG. 1 is a diagram of an overall configuration of a navigation system as an example according to an embodiment of the present invention.

An example according to an embodiment of the present invention will be explained with reference to drawings. FIG. 1 is a diagram of an overall configuration of a navigation system of the example. As shown in FIG. 1, a navigation system 1 mounted in a subject vehicle includes the following: an arithmetic unit 2 as a control unit; a position detector 3 as means for detecting or obtaining a current position; a map data storage unit 4 as means for obtaining map data; a display unit 5 as means for notifying, inquiring, or displaying; a speaker 6 as means for notifying, inquiring, or outputting sounds; and an input unit 7 as means for inputting or means for a user to accept or not.

The position detector 3 includes a gyroscope 8 for detecting a pitch angle of the vehicle as a sensor; a G sensor 9 for detecting a rolling angle of the vehicle; a distance sensor 10 for detecting a traveled distance; and a GPS (Global Positioning System) receiver 11. The above sensors or the like 8 to 11 have mutually different characteristics of detection errors. To provide highly accurate position detection, all or some of these sensors or the like 8 to 11 are combined to complement the detection errors of each other. The position detector 3 determines a current position of the vehicle based on the detection results from the sensors or the like 8 to 11.

The map data storage unit 4 includes an information storage medium such as DVD-ROM, and a reader for reading out data from the storage medium to send to the arithmetic unit 2. The read data from the storage medium includes map data, map matching data, or data for voice. The map data includes data having a link number defined for a given road section within each road. The given road section is specified using the link number.

The display unit 5 includes a display screen such as a liquid crystal display to display map data, characters, symbols, etc., in a display screen. The input unit 7 consists of a touch panel or mechanical switches integrated into the display unit 5 and is used to input data or various settings.

The arithmetic unit 2 includes a display control unit 12, a route computing unit 13, a navigating control unit 14, and a sound control unit 15. The display control unit 12 obtains current position information from the position detector 3 and displays on the screen a road map surrounding the current position based on the map data from the map data storage unit 4, further overlaying the road map with a pointer indicating the current position and a heading direction of the vehicle.

The route computing unit 13 functions as means for retrieving or designating a guide route to retrieve or designate a route from a current position to a destination. When an intermediate position is designated, the route computing unit 13 retrieves a route via the intermediate position to the destination. The intermediate position or destination is inputted via the input unit 7. To input the intermediate position or destination, for instance, one of the following methods is used: designating a certain position on a map displayed on the screen; inputting a place name or the like; and designating a phone number or facility name.

When an intermediate position or destination is inputted via the input unit 7, the route computing unit 13 retrieves a guide route from the current position to the destination or a route from the current position via the intermediate position to the destination. In this case, the route computing unit 13 retrieves several routes under conditions of distance preference, toll road preference, etc. When the user inputs to designate one of the several routes, the designated route is stored as a guide route in a route storage unit 16. To retrieve a guide route, Dijkstra method may be used.

The navigating control unit 14 functions as means for guiding a route and controlling a route guidance to read out the guide route stored in the route storage unit 16 and display the guide route on the road map in the display unit 5 via the display control unit 12. The navigating control unit 14 obtains the current position from the position detector 3. As the vehicle approaches an intersection at which the vehicle should change a heading direction, the navigating control unit 14 displays the name of the intersection and a distance to the intersection in the screen of the display unit 5. Simultaneously, the navigating control unit 14 instructs the sound control unit 15 to vocalize a direction guidance at the intersection.

The sound control unit 15 reads out the information stored as digital data in a sound storage unit 17 based on the instruction from the navigating control unit 14; the unit 15 converts the read information into analog signals and drives the speaker 6. This allows the speaker 6 to navigate by vocalizing the direction instruction such as "x direction at an intersection approximately xxx meters ahead." When a guide route is designated, the navigating control unit 14 detects whether the vehicle is currently on the guide route and instructs the route computing unit 13 to execute re-routing when the vehicle departs from the guide route. Upon receiving the instruction of re-routing, the route computing unit 13 designates a new route from the current position to the destination or from the current position via the intermediate position to the destination and stores the designated new route as the guide route in the route storage unit 16. Accordingly, the route computing unit 13 also functions as means for executing re-routing or re-designation of a guide route.

The navigation system 1 thus configured is powered on or off from a power source 19 using an ignition switch 18 for starting or stopping an engine (not shown) of the vehicle. The ignition switch 18 is a key rotary type to have four switching positions of "OFF," "ACC," "ON," and "START." With the switch 18 in the ACC position, the power is supplied to the navigation system 1 and other electronic parts; with the switch 18 in the START position, the power is further supplied to a starter motor to start the engine.

When a guide route is once designated by inputting an intermediate position and a destination, the navigation system 1 guides the user along the guide route based on a current position detected by the position detector 3. When the vehicle mistakes the heading direction to depart from the guide route, the route computing unit 13 retrieves a new guide route from the current position via an intermediate position, which has not been passed by or arrived at, to the destination using the re-routing function and guides the vehicle based on the new guide route. When the current position detected by the position detector 3 reaches a certain intermediate position designated, the certain intermediate position is determined to be passed by or arrived at. After this determination, when the vehicle departs from the guide route, a new guide route is re-designated not to go through the certain intermediate position; the certain intermediate position is eliminated from consideration as an intermediate position. In this case, a new guide route is designated to go from the current position to the destination without consideration to pass by the certain intermediate position.

Figure 3:
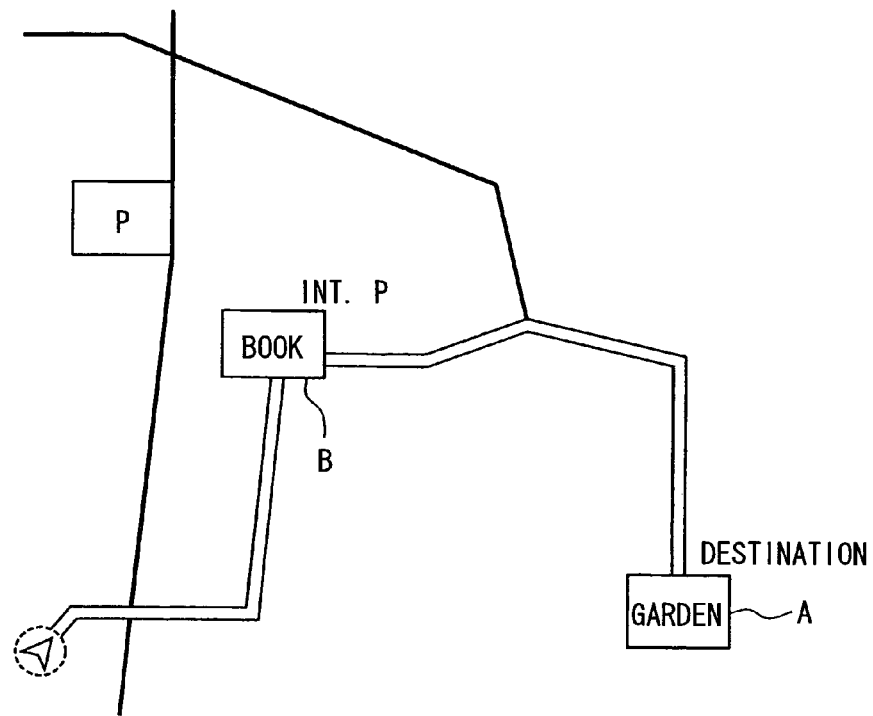
FIG. 3 illustrates an example of a guide route.

Assume that a guide route is currently designated to travel via a book store B (intermediate position) to a destination, as shown in FIG. 3. In FIG. 3 (also in FIGS. 4 and 5), the guide route is represented in a double line. In an actual driving, before arriving at the book store B, the user finds a guiding board indicating a parking lot P of the book store B and parks the vehicle at the parking lot B to walk to the book store B. Here, the parking lot P is neither included in the guide route nor along (or facing) the guide route. Changing the route to proceed to the parking lot P causes the route computing unit 13 to retrieve a new guide route and store it in the route storage unit 16.

After finishing errands in the book store B, the user starts the engine to resume the driving to the destination. The navigation system 1 then inquires of the user whether the intermediate position is determined to be passed by or arrive at and then performs a route guidance based on the result from the inquiry to the user. A control process of the navigation system 1 in this case will be explained with reference to a flowchart in FIG. 2. Here, that a vehicle passes by a certain position includes that the vehicle arrives at the certain position.

When the ignition switch 18 is operated to start the engine of the vehicle, the ACC switch is turned on to supply the navigation system 1 with power from the power source 19. The navigation system 1 starts its operation. The navigating control unit 14 then determines whether a guide route is stored in the route storage unit 16. That a guide route is stored in the route storage unit 16 at the time the vehicle starts means that the vehicle is to resume traveling according to the stored guide route, which has been designated based on a previously designated destination and possible intermediate position.

When a guide route is stored, the navigating control unit 14 determines whether there is an unpassed-by intermediate position, which is defined as an intermediate position that is not determined to have been passed by or arrived at, within the guide route (Step S1). In contrast, a passed-by intermediate position is defined as an intermediate position which is determined to have been passed by or arrived at.

At this time point, the vehicle has neither passed by nor arrived at the book store B. The navigating control unit determines that there is an unpassed-by intermediate position (Step S1: YES). Next, the navigating control unit 14 obtains a current position from the position detector 3 (Step S2).

Next, the navigating control unit 14 measures a distance from the current position (the parked position in the parking lot P) to the book store B (i.e., unpassed-by intermediate position) based on the map data obtained from the map data storage unit 4 (Step S3). The navigating control unit 14 determines whether the measured distance is within a predetermined distance d (e.g., 100 m) (Step S4). When the measured distance exceeds the predetermined distance d (Step S4: NO), the navigating control unit 14 proceeds with a usual route guidance according to the previously designated guide route (guide route in FIG. 4), which is from the current position via the book store B as the intermediate position to the destination A (Step S8).

Figure 6:

When the measured distance is within the predetermined distance d (Step S4: YES), the navigating control unit 14 selects the book store B as a candidate of a passed-by intermediate position and inquires of the user whether the book store B as the intermediate position is regarded to have been passed by or arrived at. This inquiry is notified using speech via the speaker 6 and using a screen window in the display unit 5, as shown in FIG. 6 (Step S5). When there are several candidates of passed-by intermediate positions, the screen window appears to allow the several candidates to be individually selected whether it is regarded to have been passed by or arrived at.

Figure 5:
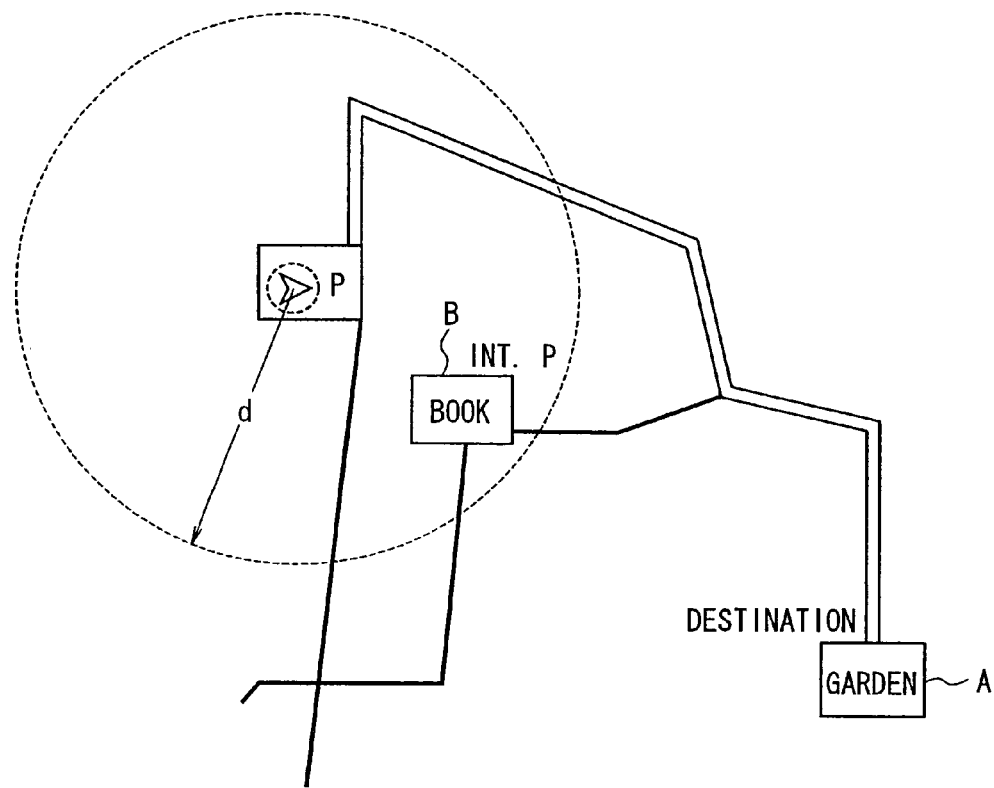
FIG. 5 illustrates an example of a guide route after an input indicating that a user has visited an intermediate position.

In the screen window in FIG. 6, the user who has visited the book store B touches the YES button indicating that the book store B is determined to have been passed by or arrived at (Step S6: YES). The touch panel as the input unit 7 inputs to the route computing unit 13 that the affirmative operation has been made. The route computing unit 13 retrieves a new guide route, which travels from the current position to the destination A while excluding the book store B from consideration as an intermediate position, i.e., in this case, without passing by or heading for the book store B as shown in FIG. 5 (Step S7). The navigating control unit 14 proceeds with the usual route guidance to guide the vehicle based on the newly designated guide route. When the vehicle reaches the destination A according to this route guidance, the navigating control unit 14 ends the route guidance (Step S9: YES).

Figure 4:
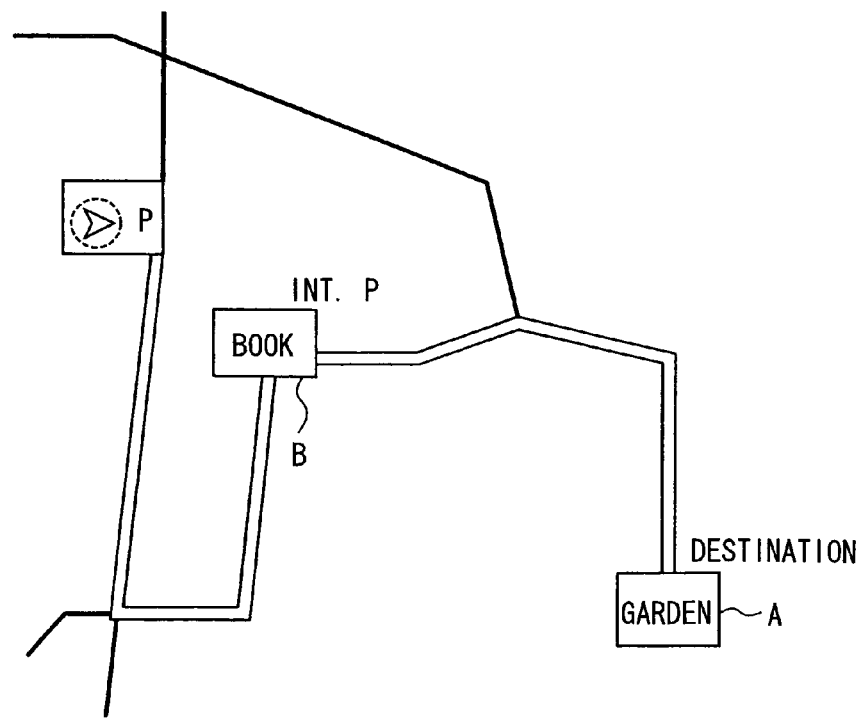
FIG. 4 illustrates an example of a guide route which is re-designated after a vehicle is parked near an intermediate position.

In contrast, when the user has not visited the book store B, the user touches the NO button indicating that the book store B has been neither passed by nor arrived at (Step S6: NO). The touch panel informs the route computing unit 13 that the negative operation has been made. The route computing unit 13 proceeds with the usual route guidance to guide the vehicle according to the route, which travels via the book store B to the destination A, as shown in FIG. 4 (Step S8). When the vehicle reaches the destination A, the navigating control unit 14 ends the route guidance (Step S9: YES).

As explained in the above example, the following steps take place: the ignition switch 18 is turned off and the vehicle is parked; the ignition switch 18 is turned on when the vehicle starts from the parking lot; and the navigation system 1 inquires of the user whether an intermediate position has been passed by or arrived at. The vehicle may be parked separate from the intermediate position, so the detection of the current position or parked position cannot enable a determination of whether the user has visited the intermediate position. In this case, the user's response to the inquiry enables the determination whether the intermediate position is regarded as a position the user has visited or passed by. This helps prevent the re-designation of a new guide route, which travels via the intermediate position to the destination, even though the user thinks that he/she has visited the intermediate position.

(Modifications)

The predetermined distance d which is used for designating a candidate of a passed-by intermediate position can be set by a user.

When the vehicle starts from the parking lot, only whether the intermediate position has been visited or not may be inquired of the user.

When the user newly inputs a destination and a certain intermediate position different from the intermediate position that has been visited, a new guide route from the parking lot via the certain intermediate position can be designated.

Further, in the above example, whether the intermediate position nearby a parking lot has been visited or not is inquired. In contrast, whether the destination nearby a parking lot has been visited or not may be inquired. For instance, the user may park the vehicle at a parking lot near a destination and walk to the destination. The user then may finish errands at the destination and back to the parking lot. In this case, when the user starts the engine, the navigating control unit 14 may measure a distance from the current position (parking lot) to the destination using the map data. When the measured distance is within a predetermined distance, the current position may be regarded or qualified as the destination.

The information indicating that the current position might be qualified as the destination is vocalized via the speaker 6 or displayed in the display unit 5. Then the user may see the display in the display unit 5 and input right or wrong against the displayed information via the input unit 7. When right is inputted, the navigating control unit 14 may end a route guidance to the destination and delete the guide route stored in the route storage unit 16. In the case where the user thinks that he/she has arrived at the destination, finished errands, and intends to return to his/her home, this helps prevent the route guidance to the destination from continuing when the user starts the engine of the vehicle.

Figure 2:
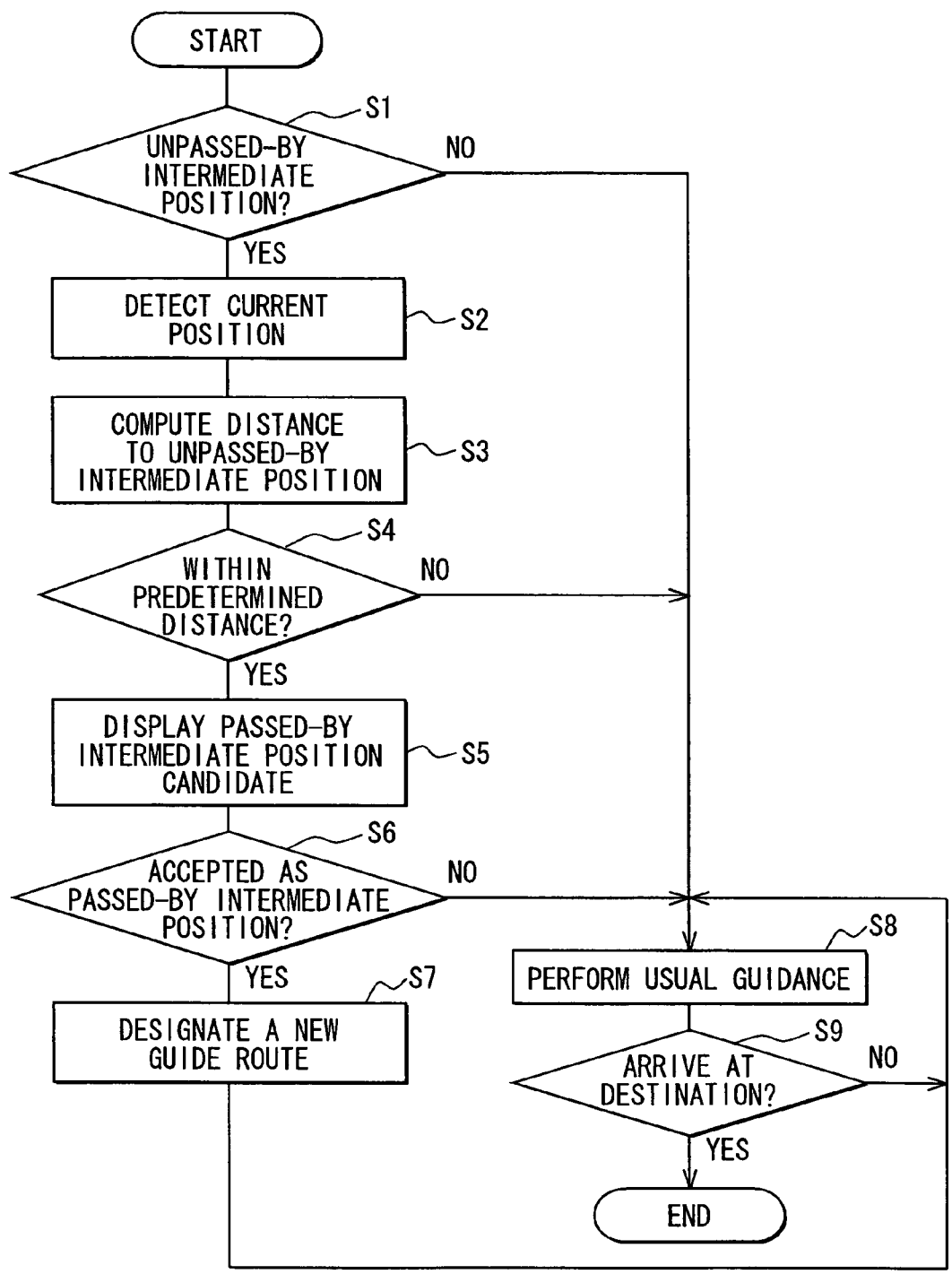
FIG. 2 is a flowchart diagram for navigating after a vehicle is parked.

In the above example, the control process of the navigation system 1 illustrated in FIG. 2 is started when the ignition switch 18 is operated to start the engine of the vehicle and the ACC switch is turned on to supply the navigation system 1 with power from the power source 19. Further, this control process can be started in another time point, e.g., when a shift lever is switched from the P (Parking) position to the D (Drive) position, or when a speed of the vehicle exceeds a predetermined speed.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation system for designating a guide route from a start position via an intermediate position to a destination to perform a route guidance by using map data obtaining means for obtaining map data and position obtaining means for obtaining a current position of the vehicle, the navigation system comprising:
a route storage unit configured to store the guide route including the intermediate position and the destination, the stored guide route being kept stored even in case that an ignition switch of the vehicle is turned from an on state into an off state;
distance measuring means for measuring using the map data, when the ignition switch is turned from the off state into the on state, a distance to the intermediate position, which is included in the guide route stored in the route storage unit, from a current position where the ignition switch is turned from the off state into the on state;
determining means for determining whether the measured distance to the intermediate position is within a predetermined distance;
inquiring means for inquiring of a user, when the measured distance is determined to be within the predetermined distance, whether or not the intermediate position is regarded as having been passed by;
an input unit configured to be used for the user to indicate a response to the inquiring by the inquiring means; and
re-routing means for executing a re-routing to retrieve, while excluding the intermediate position, a new guide route from the current position to the destination in the guide route stored in the route storing unit when the user indicates that the intermediate position is regarded as having been passed by via the input unit,
wherein when the user indicates that the intermediate position is not regarded as having been passed by, the route guidance is started based on the guide route stored in the route storage unit.

2. A navigation system provided in a vehicle for designating a guide route from a start position to a destination to perform a route guidance by using map data obtaining means for obtaining map data and position obtaining means for obtaining a current position of the vehicle, the navigation system comprising:
a route storage unit configured to store the guide route including the destination, the stored guide route being kept stored even in case that an ignition switch of the vehicle is turned from an on state into an off state;
distance measuring means for measuring using the map data, when the ignition switch is turned from the off state into the on state, a distance to the destination, which is included in the guide route stored in the route storage unit, from a current position where the ignition switch is turned from the off state into the on state;
determining means for determining whether the measured distance to the destination is within a predetermined distance;
inquiring means for inquiring of a user, when the measured distance to the destination is determined to be within the predetermined distance, whether or not the destination is regarded as having been arrived at;
an input unit configured to be used for the user to indicate a response to the inquiring by the inquiring means; and
re-routing means for executing a re-routing to retrieve a new guide route from the current position to the destination in the guide route stored in the route storing unit when the user indicates that the destination is not regarded as having been arrived at via the input unit,
wherein when the user indicates that the destination is regarded as having been arrived at, the route guidance to the destination in the guide route stored in the route storage unit is ended.

3. A navigation system provided in a vehicle, the navigation system comprising:
a map data obtaining unit for obtaining map data;
a position detector for detecting a current position of the vehicle;
a route designating unit for designating a route from a start position to a target position as a guide route;
a guiding unit for guiding the vehicle based on the guide route;

a route storage unit configured to store the guide route including the target position, the stored guide route being kept stored even in case that an ignition switch of the vehicle is turned from an on state into an off state;

a distance measuring unit for measuring using the map data, when the ignition switch is turned from the off state into the on state to thereby park the vehicle at a parked position, a distance from the parked position to the target position, which is included in the guide route stored in the route storage unit and has not been arrived at; and an inquiring unit for inquiring of a user whether the user accepts an assumption that the vehicle has arrived at the target position, when the measured distance to the target position is within a predetermined distance, wherein when the user accepts the assumption that the vehicle has arrived at the target position, the guiding unit ends the guiding of the vehicle based on the guide route up to the target position, the guide route up to the target position being stored in the route storage unit.

4. The navigation system of claim 3, wherein the target position is included in a plurality of target positions that include a destination and an intermediate position, via which the vehicle is to travel to the destination.

5. A method used in a navigation system provided in a vehicle, the method comprising:

designating a route from a start position to a target position as a guide route;

storing the guide route including the target position in a route storage unit, the stored guide route being kept stored even in case that an ignition switch of the vehicle is turned from an on state into an off state;

measuring using map data, when the ignition switch is turned from the off state into the on state to thereby park the vehicle at a parked position, a distance from the parked position to the target position, which is included in the guide route stored in the route storage unit and has not been arrived at;

inquiring of a user whether the user accepts an assumption that the vehicle has arrived at the target position, when the measured distance to the target position is within a predetermined distance; and re-designating a route from the parked position to the target position so as to update the guide route stored in the route storage unit, based on a re-routing instruction arising when the measured distance is not within the predetermined distance or when the user does not accept the assumption.

* * * * *